United States Patent [19]
Nakashima et al.

[11] Patent Number: 5,557,489
[45] Date of Patent: Sep. 17, 1996

[54] FLEXIBLE CABLE FOR FLOATING TYPE MAGNETIC HEAD DEVICE

[75] Inventors: Keishi Nakashima, Nagaoka; Masamitsu Senuma, Tsubame, both of Japan

[73] Assignee: Alps Electric Co., Ltd., Tokyo, Japan

[21] Appl. No.: 350,866

[22] Filed: Dec. 7, 1994

[30] Foreign Application Priority Data

Dec. 9, 1993 [JP] Japan .................... 5-340764

[51] Int. Cl.⁶ .................................................. G11B 5/48
[52] U.S. Cl. .................................................... 360/104
[58] Field of Search ................................. 360/103, 104, 360/105, 128

[56] References Cited

U.S. PATENT DOCUMENTS

| | | |
|---|---|---|
| 4,972,280 | 11/1990 | Iwata . |
| 5,006,946 | 4/1991 | Matsuzaki . |
| 5,166,846 | 11/1992 | Shigemoto ............... 360/104 |
| 5,185,683 | 2/1993 | Oberg et al. . |
| 5,296,983 | 3/1994 | Blanc et al. .............. 360/104 |
| 5,305,167 | 4/1994 | Nagase et al. ............ 360/103 |
| 5,384,432 | 1/1995 | Noro et al. ............... 360/104 |
| 5,392,179 | 2/1995 | Sendoda ................... 360/104 |

Primary Examiner—A. J. Heinz
Assistant Examiner—Paul J. Ditmyer
Attorney, Agent, or Firm—Guy W. Shoup; Patrick T. Bever

[57] ABSTRACT

For the purpose of obtaining better flexibility in a case where a flexible cable is used for the wiring of a head main body of a floating type magnetic head than the flexibility obtained in a case where a copper wire is used for the same to maintain satisfactory degree of freedom of the head main body, the equation shown below shall be satisfied:

$$W/L \leq -15(A \times Dc + Dp) + 0.5$$

where $W$=width of a band-shaped portion to be a bending portion of a flexible cable to be used for the wiring of the head main body, $L$=length of the band-shaped portion, $Dp$=thickness of the cable base material of the above portion, $Dc$=thickness of the conductor layer of the above portion, $A$=area ratio of the conductor layer to the cable base material.

4 Claims, 7 Drawing Sheets

FLEXIBLE CABLE FOR FLOATING TYPE MAGNETIC HEAD DEVICE

BACKGROUND OF THE INVENTION

1. Field of the Invention

The present invention relates to a floating type magnetic head to be used for a hard disk device or a photoelectromagnetic disk device, etc.; in particular, it relates to a floating type magnetic head in which a magnetic head main body and a supporting member which supports the magnetic head main body are connected with a flexible cable.

2. Description of the Related Art

Figure 13:
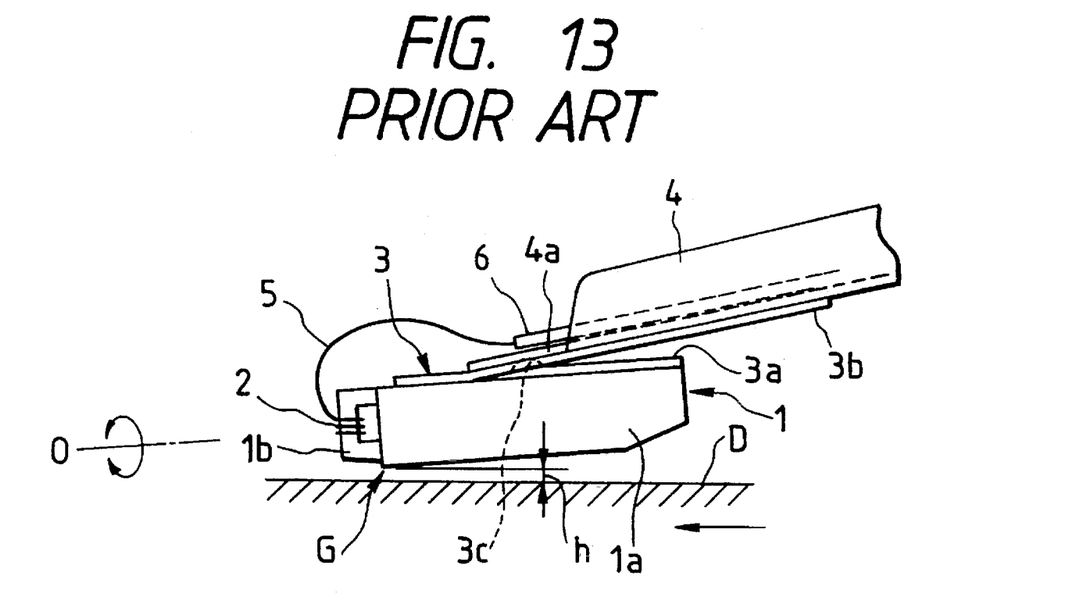
FIG. 13 is a side view showing a conventional floating type magnetic head.

FIG. 13 is a side view showing the constitution of a conventional floating type magnetic head.

A head main body 1 of the magnetic head comprises a slider 1a, a core 1b joined to the slider 1a, and a coil 2 which is wound on the core 1b, and a magnetic gap is formed at a joining portion of the slider 1a and the core 1b.

A supporting member of the head main body 1 is constituted with a flexor 3 and a load beam 4. The flexor 3 is formed with a thin flat spring, and has a joining portion 3a and a supporting portion 3b. The slider 1a of the head main body 1 is bonded on the under surface of the joining portion 3a of the flexor 3. The supporting portion 3b of the flexor 3 is fixed on the bottom surface of the load beam 4 by means of welding or the like. A spherical shaped pivot 3c is formed in unity with the joining portion 3a of the flexor 3, and the upper end of the pivot 3c makes contact with the bottom surface 4a of the load beam 4.

The base portion of the load beam 4 is supported with a flat spring, and the head main body 1 is pressed elastically onto the surface of a recording medium D by the light elastic force of the flat spring. When a recording medium D moves in the arrow direction, the head main body 1 is floated by the air stream between the slider 1a and the recording medium D. The floated posture of the head main body 1 is in a slanted state where the trailing side provided with a magnetic gap is inclined slightly downward.

In the case of a conventional floating type magnetic head, a lead wire 5 extending from the coil 2 is a copper wire being used for the coil 2, and the lead wire 5 is led to the load beam 4 in a state where it is bent in the air and inserted into a tube 6. The tube 6 is fixed on the load beam 4.

The posture of the head main body 1 in a floated state is arranged to be freely changeable in that it is supported by the apex of the pivot 3c which acts as a fulcrum; thereby the predetermined floating posture of the head main body 1 can be held along the surface of a recording medium. The device is constituted to make the influence of the lead wire 5 as little as possible for the free movement of the head main body 1 by bending the lead wire 5 into a loop between the head main body 1 and the load beam 4.

As shown in FIG. 13, in a case where the wiring between the load beam 4 and the head main body 1 is implemented with a copper lead wire 5, a plurality of copper wire elements of the lead wire 5, extending from the coil 2, have to be bundled to insert them into the tube 6; such a work is troublesome and also the automation of such a work is difficult.

In recent years, a thin film magnetic head in which thin film elements are provided in an end part of the slider 1a on the trailing side has been developed; in this case, individual elements of the lead wire 5 have to be connected to individual terminal portions of the thin film elements, and further the plurality of element wires have to be bundled to insert them into the tube 6; thus assembling work becomes further complicated.

Therefore, the use of a flexible cable for the wiring between the head main body 1 and the load beam 4 has been considered. When a flexible cable is used, the wiring work becomes simpler than that in a conventional case, and in the case of a head main body 1 having thin film elements, the land portion at the tip of the flexible cable can be directly soldered to the terminal portions of the thin film elements; thereby, the wiring process can be made very easy.

In the case of a flexible cable, however, it is inferior to a copper lead wire in terms of flexibility, so that the movement of the head main body 1 may be restricted by the flexible cable, and the degree of freedom in the movement of the head main body 1 is lowered. As a result, the floating posture of the head main body 1 becomes unstable in recording/playback operation, and the fluctuation in the floating height h of the recording/playback function portion of the head main body 1 (in FIG. 13, the magnetic gap portion, G) from the recording medium D becomes large. In the case of a track access operation of the head main body 1, the resonance amplitude in a rolling direction for a shaft 0 is made larger by the torsion resonance of the flexible cable, etc. in comparison with that in a conventional case.

SUMMARY OF THE INVENTION

The present invention is provided for the purpose of solving the above-mentioned problem. An object of the present invention is to offer a floating type magnetic head in which when the head main body and the supporting member are connected with a flexible cable, the flexibility of a bending portion of the flexible cable can be maintained at almost in the same level as that of a copper wire, and the fluctuation in the floating quantity or the increase in the resonance amplitude of the head main body can be prevented.

A device according to the present invention is a floating type magnetic head comprising a magnetic head main body which faces and floats above recording medium, a supporting member supporting the magnetic head main body in a movable state, and a flexible cable having a bending portion for connecting the supporting member and the magnetic head main body; the above-mentioned device is characterized in that the following expression holds true when it is assumed that the width dimension of at least a part of the bending portion of the above-mentioned cable is W, the length of the portion is L, the thickness dimension of the cable base material of the part is Dp, the thickness dimension of the electricity conduction layer is Dc, and the area ratio of the electricity conduction layer to the cable base material is A, $$W/L \leq -15(A \times Dc + Dp) + 0.5 \quad (1)$$

It is made possible to make the degree of freedom of the movement of the head main body be equivalent to that of the copper wire, the fluctuation of the floating quantity of the head main body from a recording medium be small, and the resonant amplitude in the rolling direction in the track access time, etc. be small by the inclusion of a portion which satisfies the above-mentioned equation (1) in the bending portion of the flexible cable.

DESCRIPTION OF THE PREFERRED EMBODIMENTS

Figure 1:
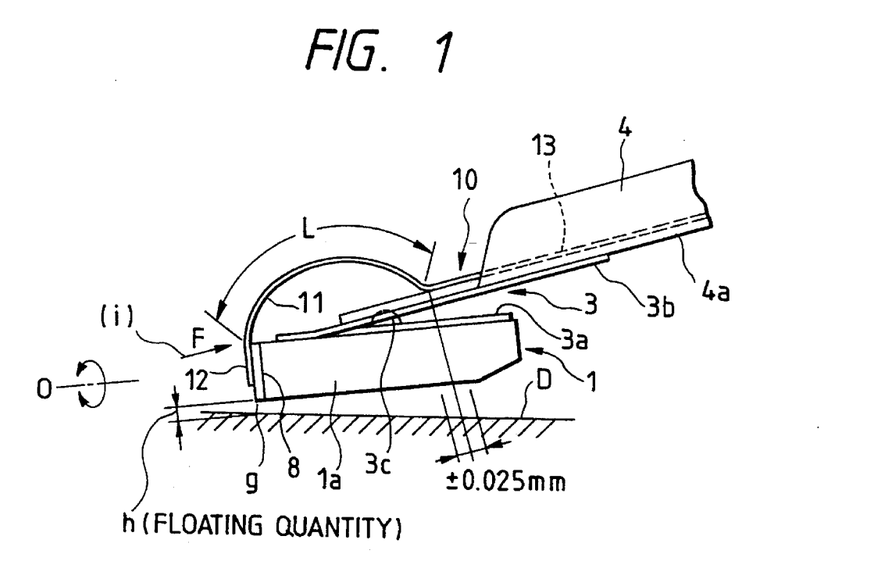
FIG. 1 is a side view of a floating type magnetic head according to the present invention.
Figure 2A:
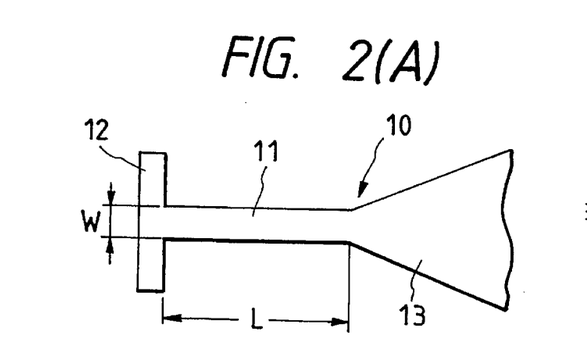
FIG. 2(A) is a plan view of a flexible cable.
Figure 2B:
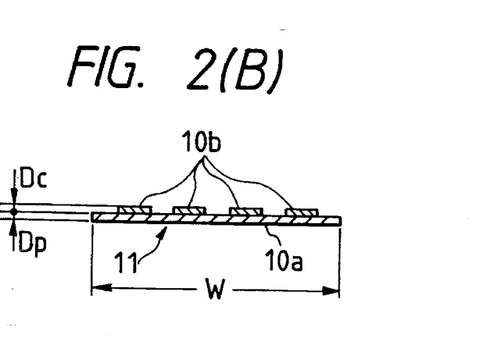
FIG. 2(B) is a cross sectional view of the flexible cable.

FIG. 1 is a side view showing the external appearance of a floating type magnetic head according to the present invention, FIG. 2(A) is a plan view of a flexible cable, and FIG. 2(B) is a cross sectional view of the flexible cable.

In the head main body 1 of the floating type magnetic head shown in FIG. 1, thin film elements 8 are provided on the end surface of the slider 1a on the trailing side. The thin film elements 8 include, for example, a magnetic reluctance effect element for playback, and also include a plane type coil pattern and a core layer for recording; a portion shown by g in FIG. 1 is the recording/playback function portion.

The flexor 3 comprises a joining portion 3a and a supporting portion 3b, and the upper surface of the slider 1a is bonded to the joining portion 3a, and the supporting portion 3b is fixed on the bottom surface of the load beam 4. A pivot 3c is formed on the joining portion 3a of the flexor 3, and the head main body 1 is arranged to be able to move in making the contact portion between the pivot 3c and the load beam 4 a fulcrum.

A flexible cable 10 is used as a wiring means from the thin film elements 8 to the load beam 4. As shown in FIG. 2(A), a band-shaped portion 11 having a predetermined width dimension W and a length dimension L is provided in the flexible cable 10. A land connecting portion 12 is provided on the tip part of the band-shaped portion 11, and a bonding portion 13 which grows wider toward the base is formed in the base part of the band-shaped portion 11.

In FIG. 1, the bonding portion 13 is bonded to the upper surface of the load beam 4, and the land connecting portion 12 is bonded to a position overlapping the thin film elements 8, and the land portion on the side of the flexible cable and the terminal portion of the thin film elements 8 are connected electrically. The whole length of the band-shaped portion 11 becomes the bending portion which is bent into a loop in the air. In FIG. 1, the length of the bending portion coincides with the length dimension L of the band-shaped portion 11.

As shown in FIG. 2(B), the flexible cable 10 is composed of a cable base material 10a and a conductor layer 10b formed on the surface or the back of the cable base material 10a, and in general, the cable base material 10a is of polyimide film and the conductor layer is of copper foil.

In a case where it is assumed that the width dimension is W and the length dimension is L of the band-shaped portion 11 to be the bending portion, the thickness dimension of the cable base material 10a is Dp and the thickness dimension of the conductor layer 10b is Dc of the band-shaped portion 11, and the ratio of the area of the cable base material 10a to the area of the total conductor layer 10b of the band-shaped portion 11 is A, and when the above-mentioned values satisfy equations (1), it is possible to obtain a degree of freedom of the head main body 1 which is good enough to be used for a floating type magnetic head.

The process of setting up equation (1) will be explained in the following.

Figure 3:
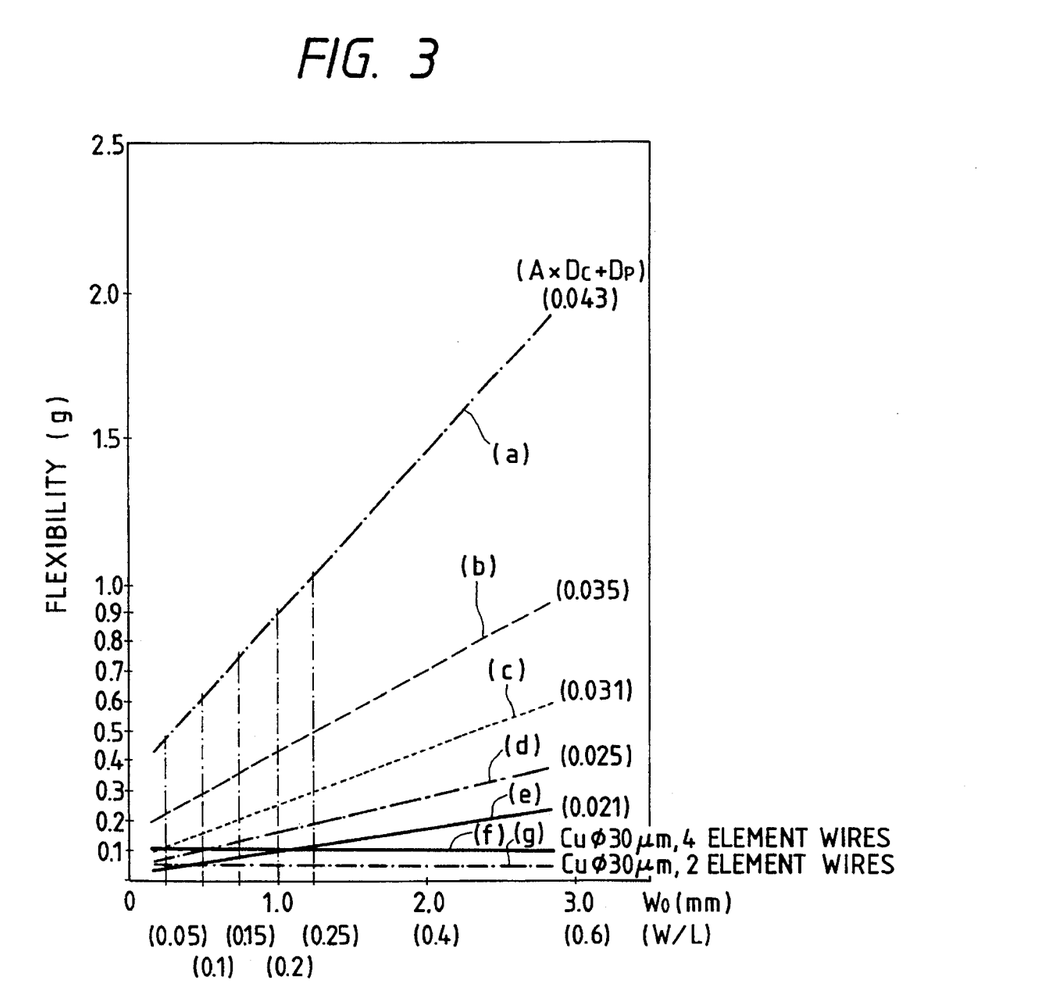
FIG. 3 is a chart showing the measurement results of flexibility concerning specimens of a plurality of kinds of flexible cables and copper wires.

FIG. 3 shows the results of the measurement of flexibility performed on the cables having various combinations of the above-mentioned dimensions and copper wires which have been used as a lead wire 5.

Figure 4A:
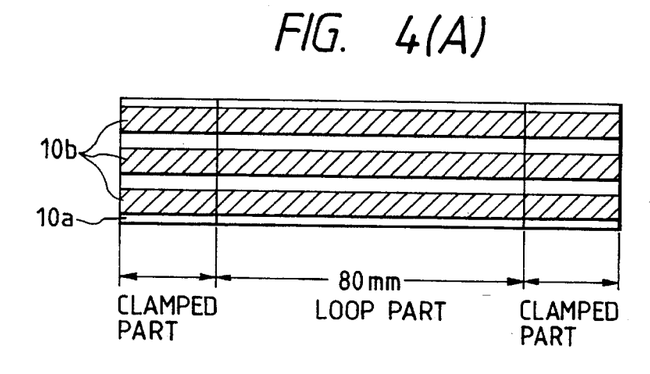
FIG. 4(A) is a plan view of a specimen which is used in the measurement of flexibility.
Figure 4B:
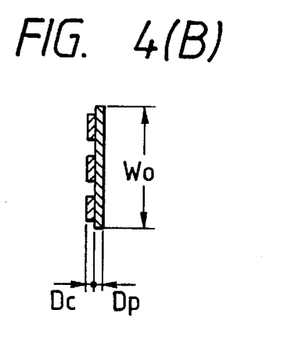
FIG. 4(B) is a cross sectional view of the above-mentioned specimen.
Figure 5:
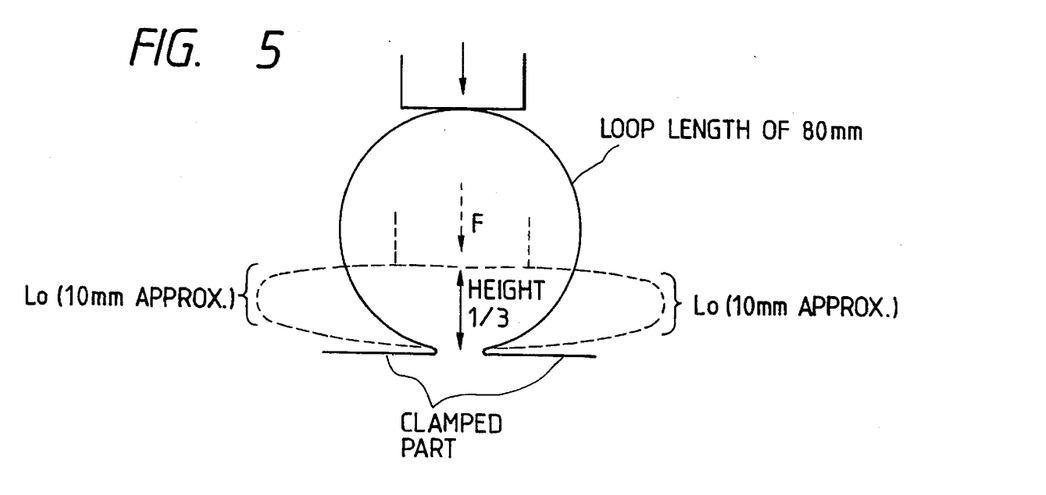
FIG. 5 is a front view showing the measuring method of flexibility.

FIG. 4(A) and FIG. 4(B) show the specimens used in the measurement, and FIG. 5 shows the measuring method of flexibility using a loop flexibility tester.

Band-shaped flexible cables of a predetermined width dimension were used as specimens. The cable base material 10a of the flexible cables used as specimens is of polyimide film and the conductor layer is of copper foil. In FIG. 4, the width dimension of a specimen is expressed by $W_0$ and the thickness dimensions of the cable base material 10a and the conductor layer 10b are expressed by Dp and Dc respectively.

The specimens of flexible cables used in the measurement are shown in Table 1 in items, (a) to (e), and they have different combinations of Dp, Dc and A from each other. The calculated values of (A×Dc+Dp) are, in the order of the specimens, (a) to (e), 0.0425, 0.035, 0.031, 0.025, and 0.021. In the flexibility measurement, a plurality of specimens of different values of $W_0$ were prepared in each item of specimens, (a) to (e), and measurement was performed on each specimen.

TABLE 1

| Symbol | Dp (mm) | Dc (mm) | A | A × Dc + Dp |
| --- | --- | --- | --- | --- |
| (a) | 0.025 | 0.035 | 0.5 | 0.0425 |
| (b) | 0.025 | 0.020 | 0.5 | 0.035 |
| (c) | 0.025 | 0.020 | 0.3 | 0.031 |
| (d) | 0.015 | 0.020 | 0.5 | 0.025 |
| (e) | 0.015 | 0.020 | 0.3 | 0.021 |

In the measurement of flexibility as shown in FIG. 5, concerning the flexible cables of respective specimens, a part of 80 mm long of each of these specimens was made to form an approximately circular loop and both ends of it were fixed. A load was given to the loop on the top of it, and when the height dimension was made to be ⅓, the load F at the time was measured.

In each group of the specimens, (a) to (e), a plurality of specimens of different width dimensions $W_0$ were measured.

In FIG. 3, the width dimension $W_0$ is taken on the axis of abscissas and the load F (in gram) when the height of a loop is made to be ⅓ is taken on the axis of ordinates, and the measurement results on flexibility are expressed by the load F. In FIG. 3, it is seen that the load F becomes larger, that is, the flexibility is proportionally lowered with the increase in the width dimension of a specimen in each group of specimens, (a) to (e).

Now, comparison will be made between the bending state of the flexible cable 10 in the wiring to the head main body 1 shown in FIG. 1 and the bending state of a specimen used in the measurement shown in FIG. 5. In the measurement shown in FIG. 5, the load F when the height of a loop part of 80 mm long is made to be ⅓ is regarded as the result of the measurement. On the other hand, when the bending state of the band-shaped portion 11 of 80 mm long shown in FIG. 1 is considered, the direction of load shown by a narrow mark (i) in FIG. 1 corresponds to the direction of load of F shown in FIG. 5. In FIG. 5, a bending part which mainly contributes to the variation of load F is not the whole loop length 80 mm, but the parts of the predetermined length $L_0$ on both sides of the loop contribute to the variation of load F. The length of $L_0$ is about 10 mm. Therefore, in the measurement of individual specimens, (a) to (e), if attention is paid to the bend in the parts on both sides of 10 mm long caused by a load F, it is known that the value of F approximates to the flexibility in an actual wiring as shown in FIG. 1.

In the measurement shown in FIG. 5, the parts $L_0$ which contribute to the flexibility of flexible cables in (a) to (e) in Table 1 exist on both sides; therefore, the above-mentioned measurement is equivalent to the measurement of the flexibility of a flexible cable of $L_0 = 10$ mm and of width=$2 \times W_0$. Therefore, the dimensional ratio between the length and the width of a part of a flexible cable which contributes to the measured load F shown in FIG. 5 is $(2 \times W_0/L_0) = (2 \times W_0/10)$. The value corresponds to ratio of width to length (W/L) of the band-shaped portion 11 when the specimens in (a) to (e) are actually used for the wiring as shown in FIG. 1.

Therefore, along the axis of abscissas in FIG. 3 there are written the values of $W_0$ (mm) and also the values of $(W/L)=(2 \times W_0/10)$ beneath the former.

Figure 6:
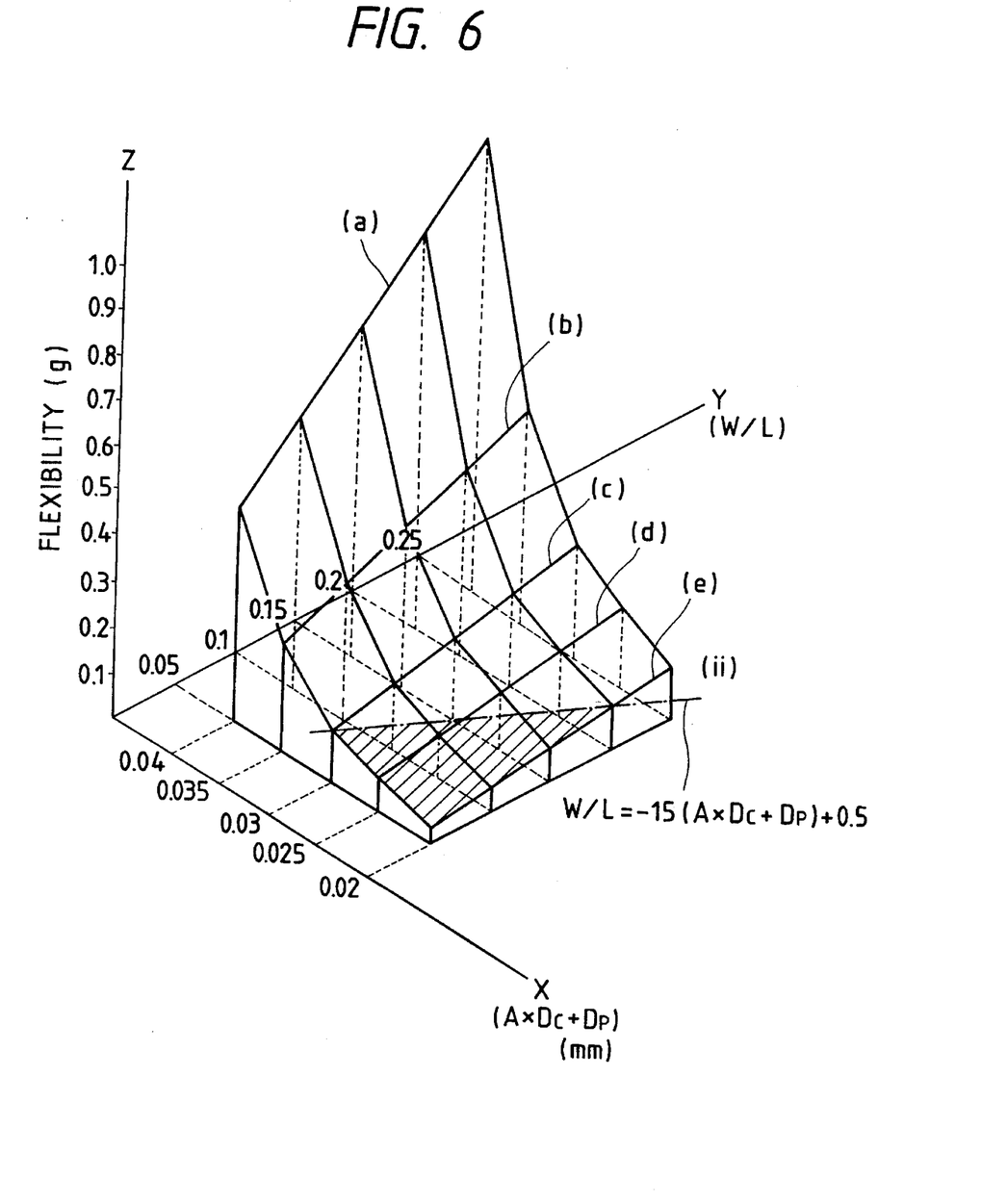
FIG. 6 is a chart showing the chart shown in FIG. 3 being transformed to the three dimensional coordinates.

FIG. 6 expresses the measurement results shown in FIG. 3 in the three dimensional coordinates of X–Y–Z. The Y axis in FIG. 6 shows the value of (W/L) written along the axis of abscissas in FIG. 3 and the Z axis shows the measurement results of flexibility F which corresponds to the axis of ordinates in FIG. 3. The X axis shows the value of ($A \times Dc + Dp$).

FIG. 3 corresponds to the projected plan of respective measurement values shown in the Y–Z coordinates in FIG. 6, and the straight lines, (a) to (e), in FIG. 3 correspond to the straight lines, (a) to (e), in FIG. 6 respectively. As seen from FIG. 6, in the case of a band-shaped member when (W/L) becomes smaller (with the change to be thinner and longer), flexibility is upgraded. The parameter ($A \times Dc + Dp$) is the one concerning the thickness dimension, and when the parameter becomes smaller, the flexibility is upgraded.

The measurement of flexibility as shown in FIG. 5 was performed concerning a copper wire of 30 μm diameter which has been used as a lead wire 5 together with the measurement of the specimens, (a) to (e), described in the above. In FIG. 3, the measurement result of a stranded wire being composed of four copper element wires of 30 μm diameter is shown as a specimen (f), and that of a stranded wire being composed of two copper element wires of the same size is shown as a specimen (g).

In the case of a stranded wire of four element wires of 30 μm diameter, there is no problem in the degree of freedom in motion, so that when a flexible cable has the flexibility being equal to or better than that of the specimen (f), it can be good enough for the practical use as a wiring for a floating type magnetic head.

As shown in FIG. 3, the measured value of flexibility (load F) of the specimen (f) was 0.11 gram. Therefore, judging from the measurement result of the specimen (f), when the flexibility of a wire to be used for the wiring of the head main body 1 is less than 0.1 gram, the wire is good enough. When the measurement result of the specimen (f) is given to the three dimensional coordinates shown in FIG. 6, it becomes a plane parallel to the X–Y plane passing through a point 0.1 on the Z axis. An intersection line between the above-mentioned plane and the lines of the three dimensional graph of measurement values of respective specimens shown in FIG. 6 is found to be an approximate straight line (ii).

An equation expressing the straight line (ii) in the coordinates, X–Y, is found to be $Y = -15X + 0.5$, that is, $$W/L = -15(A \times Dc + Dp) + 0.5 \tag{2}$$

The area shown by crosshatching in FIG. 6 is an area in which flexibility is less than 0.1 gram. When the area is expressed by an equation, it is equivalent to equation (1).

Judging from the above, when a wiring for the head main body 1 is performed in bending a band-shaped portion 11 of width dimension W and the length dimension L to form a loop, if Dp, Dc, A, W, and L are set in the range satisfying the equation (2) and equation (2), it is possible to obtain better flexibility than that obtained when wiring is performed with a copper wire of 30 μm diameter.

Next, embodiments in each of which the wiring of the head main body 1 is actually performed using a flexible cable which satisfies the conditions defined by equation (1), and comparative examples in each of which the wiring of the head main body 1 is performed using a flexible cable which does not satisfy the conditions defined by equation (2) and equation (2) will be explained, and the characteristics of a floating type magnetic head will be explained in the following.

Embodiment (a)

As shown in FIG. 2, a band-shaped portion 11 which forms a bending portion when it is used for the wiring of a head main body 1 has a dimension of length L and a predetermined dimension of width W, and a cable base material 10a is of polyimide film, and a conductor layer 10b is of copper foil.

The dimensions of respective parts of the band-shaped portion 11 are as shown below: Dc=0.020 mm, Dp =0.015 mm, A=0.5, ($A \times Dc + Dp$)=0.025; W=0.3 mm, L=5.0 mm, and W/L=0.06. These values satisfy equation (1).

Wiring was performed in a form of a loop as shown in FIG. 1 using the band-shaped part 11 of the above-mentioned flexible cable, and the coefficient of fluctuation of the floating quantity h of the magnetic recording/playback function portion g was measured in actually operating a test hard disk and making the head main body float. The coefficient of fluctuation was 5.5%.

The primary resonance gain in the rolling direction of the head main body 1 for a horizontal shaft O was measured, and the result was 1.5 dB.

Embodiment (b)

Similar to the case of the embodiment (a), the band-shaped portion 11 to be a bending portion when it is used for the wiring of the head main body 1 has a length L and a predetermined width W, and the cable base material 10a is of polyimide film, and the conductor layer is of copper foil.

The dimensions of respective parts are as shown below: Dc=0.020 mm, Dp=0.015 mm, A=0.5, (A×Dc+Dp)=0.025, W=0.4 mm, L=4.0 mm, and W/L=0.10. These values satisfy equation (1).

In this case, the coefficient of fluctuation of the floating quantity h of the magnetic recording/playback function portion g was 6.5%, and the primary resonance gain was 3.0 dB.

Comparative example (a)

Similar to the embodiment (a), a band-shaped portion 11 to be a bending portion when it is used as a wiring of the head main body 1 has a length L and a predetermined width W, and a cable base material 10a is of polyimide film, and a conductor layer 10b is of copper foil.

The dimensions of respective parts are as shown below: Dc=0.020 mm, Dp=0.015 mm, A=0.5, (A×Dc+Dp)=0.025, Dp)=0.025, W=0.4 mm, L=3.0 mm, and W/L=0.13. These values do not satisfy equation (1).

In this case, the coefficient of fluctuation of the floating quantity h of the magnetic recording/playback function portion g was 7.5%, and primary resonance gain was 4.5 dB.

Comparative example (b)

Similar to the above, the band-shaped portion 11 to be a bending portion when it is used for the wiring of the head main body 1 has a length L and a predetermined width W, and the cable base material 10a is of polyimide film and the conductor layer is of copper foil.

The dimensions of respective parts are as shown below: Dc=0.020 mm, Dp=0.015 mm, A=0.5, (A×Dc+Dp)=0.025, W=0.5 mm, L=2.5 mm, and W/L=0.20. These values do not satisfy equation (1).

In this case, the coefficient of fluctuation of the floating quantity h of the magnetic recording/playback function portion g was 9.5% and the primary resonance gain was 9.5 dB.

Comparative example (c)

Similar to the above, the band-shaped portion 11 to be a bending portion when it is used for the wiring of the head main body 1 has a length L and a predetermined width W, the cable base material 10a is of polyimide film, and the conductor layer 10b is of copper foil.

The dimensions of respective parts are as shown below: Dc=0.020 mm, Dp=0.015 mm, A=0.5, (A×Dc+Dp)=0.025, W=0.5 mm, L=2.0 mm, and W/L=0.25. These values do not satisfy equation (1).

In this case, the coefficient of fluctuation of the floating quantity h of the magnetic recording/playback function portion g was 10.0% and the primary resonance gain was 7.0 dB.

As shown in FIG. 1, in the bonding process of the band-shaped portion 11 of a flexible cable 10, some dispersion cannot be avoided in the bonding positions of cables to the load beam; however, in the above-mentioned embodiments and comparative examples, the bonding work was capable of controlling the dispersion of bonding end positions on the load beam 4 to be in the range of ±25 μm.

The relations among the dimensions, the coefficients of fluctuation of floating quantities, and the values of the primary resonance gains are summarized in Table 2 shown below.

TABLE 2

| Specimen | A × Dc + Dp | W | L | W/L | Equation | Coefficient of fluctuation of floating quantity (%) | Primary resonance gain (dB) |
| --- | --- | --- | --- | --- | --- | --- | --- |
| Embodiment (a) | 0.025 | 0.3 | 5.0 | 0.06 | Eff. | 5.5 | 1.5 |
| Embodiment (b) | 0.025 | 0.4 | 4.0 | 0.10 | Eff. | 6.5 | 3 |
| Comparative example (a) | 0.025 | 0.4 | 3.0 | 0.13 | Non. | 7.5 | 4.5 |
| Comparative example (b) | 0.025 | 0.5 | 2.5 | 0.20 | Non. | 9.5 | 6.5 |
| Comparative example (c) | 0.025 | 0.5 | 2.0 | 0.25 | Non. | 10.0 | 7 |

Figure 7:
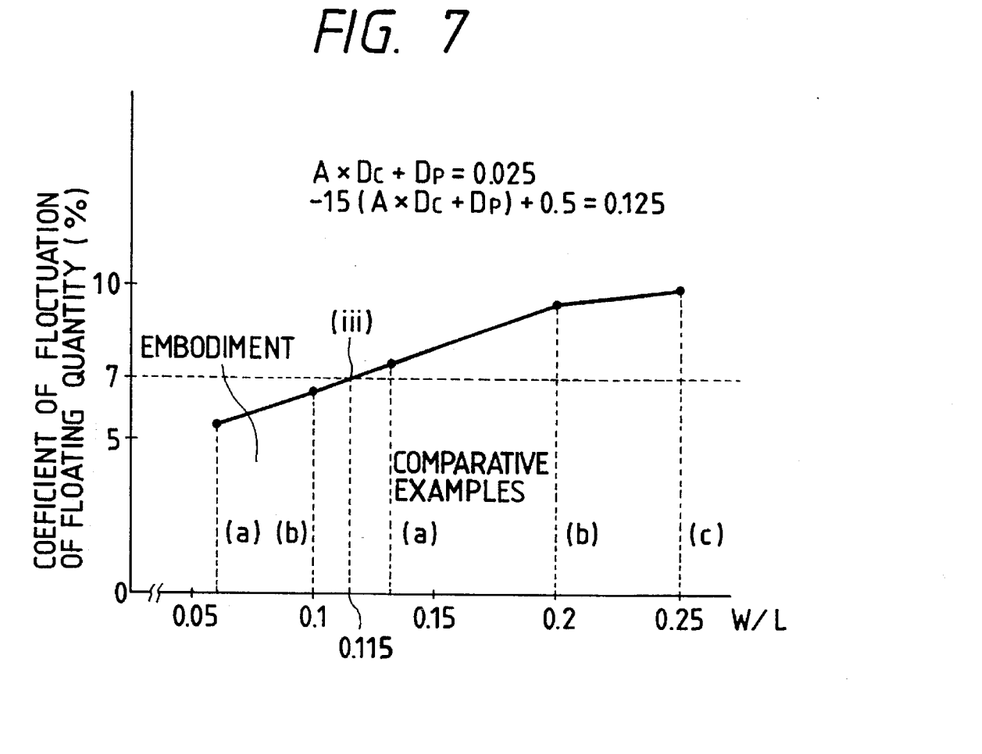
FIG. 7 is a chart showing the measurement results of the fluctuation coefficients of floating quantities in the embodiments and the comparative examples.

Next, FIG. 7 is a chart showing the relations between the respective dimensions in the embodiments and the comparative examples and the fluctuation coefficients of floating quantities shown in Table 2.

In FIG. 7, the axis of abscissas shows the value of W/L, and the axis of ordinates shows the value of the fluctuation coefficient of floating quantity. The fluctuation coefficients of floating quantities in the embodiments, (a) and (b), and the comparative examples, (a), (b) and (c), are plotted on the coordinates and they are connected with straight lines.

In the case of a floating type magnetic head for a hard disk, general specification range of the fluctuation coefficient of floating quantity being allowable for a recording/playback function portion g is ±10%, that is, 20% in the fluctuation width. Besides the above, following may cause the fluctuation in the floating quantity: a spring force which presses the head main body 1 against a recording medium, a shape of the ABS plane of a slider 1a, etc. The floating quantity can be fluctuated by the elements as described in the above, so that, in consideration of the influence of these elements, the allowable fluctuation coefficient of the floating quantity caused by the wiring portion to the head main body 1 will be ⅓ of the 20%, that is, about 7%.

In FIG. 7, when the fluctuation coefficient of 7% is shown with a straight line, it is understood that the embodiments, (a) and (b), are in the allowable range, on the other hand, the comparative examples, (a), (b) and (c), are out of the allowable range.

In FIG. 7, the intersecting point of the horizontal line of the fluctuation coefficient of the floating quantity of 7% with the lines in the graph in the coordinates is found to be a point (iii), and the value of W/L at the point is about 0.115. In both embodiments and comparative examples, the value of [(A× Dc×Dp)+0.5] is 0.125. It means that equation (1) (2) hold good approximately at the intersecting point (iii), and it is verified that equations, (1) and (2), are very accurate.

Figure 8:
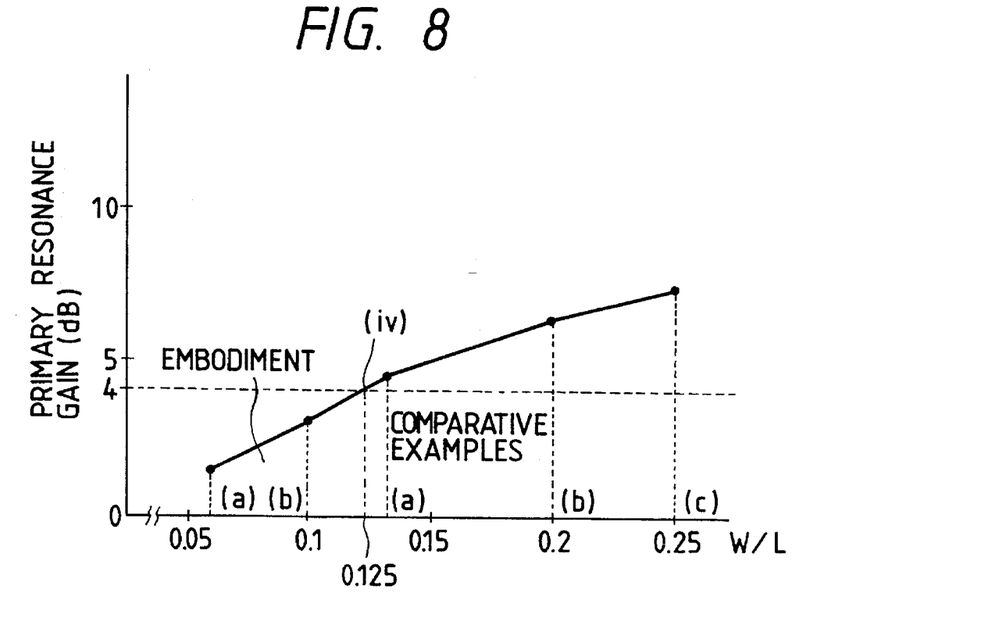
FIG. 8 is a chart showing the measurement results of the primary resonance gains in the embodiments and the comparative examples.

FIG. 8 is a chart based on Table 2, and the axis of abscissas shows W/L and the axis of ordinates shows the primary resonance gain, and the measured values of the primary resonance gains in the embodiments and the comparative examples are plotted and they are connected with straight lines. In a track access time, there is no practical problem when the primary resonance gain is less than 4 (dB). When a horizontal line of the primary resonance of 4 (dB) is written in the coordinates and an intersecting point (iV) of the line and the line in the graph is obtained, it is found that the embodiments, (a) and (b), are both in the allowable range, and the comparative examples, (a), (b) and (c), are out of the allowable range.

The value of W/L at the intersecting point (iV) is found to be approximately 0.125 in the chart. Since the value of [−15(A×Dc+Dp)+0.5] is 0.125, equation (1) hold true at the intersecting point. Therefore, it is understood that when a flexible cable in the range of equation (1) is used, the primary resonance gain is less than the allowable range of 4 (dB).

Figure 9:
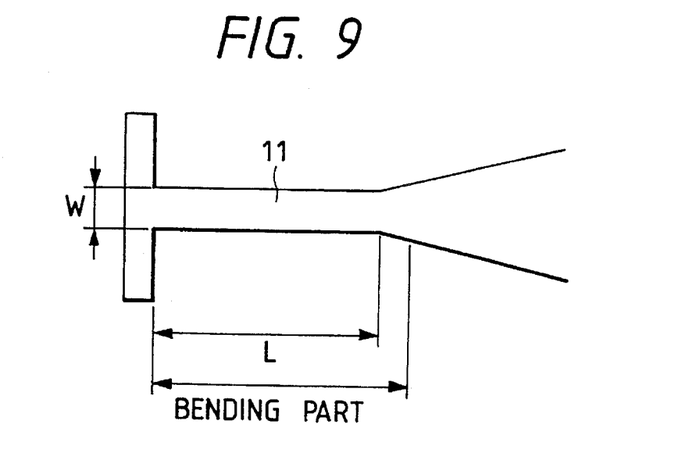
FIG. 9 is a plan view showing a modified example of a flexible cable.

In the case of wiring using a flexible cable according to the present invention, even when the length of the bending portion is longer than the length L of a band-shaped portion 11 which satisfies equation (1) as shown in FIG. 9, the flexibility of the wiring can be displayed enough. In other words, it is good enough if a band-shaped portion 11 which satisfies equation (1) is contained in the bending portion of a flexible cable used for the wiring from the head main body 1 to the load beam 4.

Figure 10:
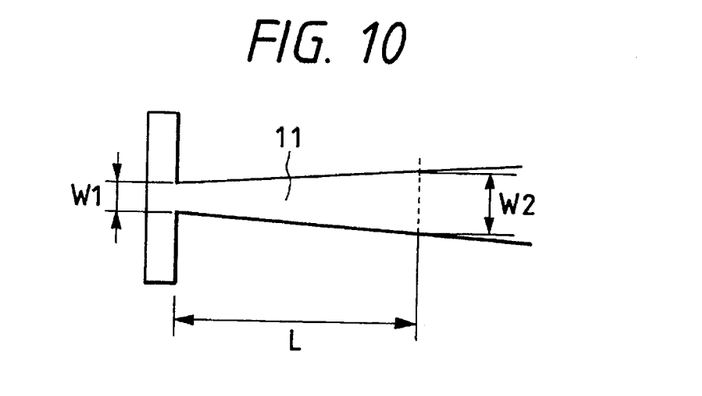
FIG. 10 is a plan view showing another modified example of a flexible cable.

As shown in FIG. 10, even when the bending portion of a flexible cable used for the wiring of the head main body 1 has a shape which varies its width dimension from W1 to W2 gradually, it is in the category of the embodiment according to the present invention. In this case, W2/L is found for the maximum width in the bending portion, and the value of (A×Dc+Dp) is obtained from the thickness dimensions of the cable base material and that of the conductor layer, and the area ratio, and these values which satisfy equation (1) will be selected. The value of [(W1+W2)/2×L] is found from the average of width dimensions, W1 and W2, and the left side of equation (1) may be replaced with the above-mentioned value.

Figure 11:
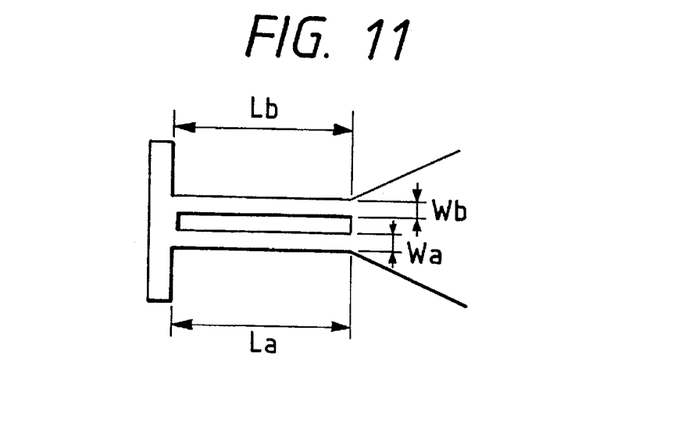
FIG. 11 is a plan view showing a modified example in which a bending portion of a flexible cable is separated into a plurality of elements.
Figure 12:
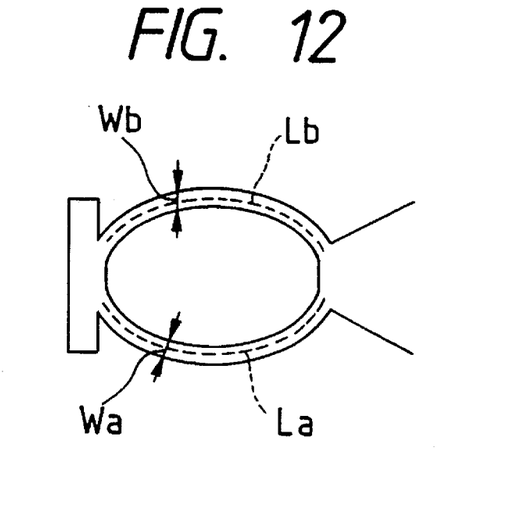
FIG. 12 is another plan view showing a modified example in which a bending portion of a flexible cable is separated into a plurality of elements.

Further, as shown in FIG. 11 and FIG. 12, when the bending portion of a flexible cable is separated into a plurality of elements and when the lengths of the separated parts are assumed to be La and Lb and the width dimensions of the separated parts are assumed to be Wa and Wb, the left side of equation (1) will be replaced with (La/Wa) +(Lb/Wb).

As described in the above, in the present invention, in the case where a flexible cable is used for the wiring of the head main body, better degree of freedom of the head main body can be obtained than that obtained in the case where a conventional copper wire is used.

What is claimed is:

1. A floating type magnetic head comprising:
   a magnetic head main body which faces and floats above a moving recording medium;
   a supporting member supporting said magnetic head main body movably;
   a flexible cable having a bending portion, connecting said supporting member and said magnetic head main body the bending portion including a cable base material and a conductor layer formed on the cable base material; and
   respective parts having dimensions as shown below satisfying equation (1):

$$W/L \leq -15(A \times DC + Dp) + 0.5,$$

wherein the width dimension of at least a part of the bending portion of said flexible cable is W, the length of the bending portion is L, the thickness dimension of the cable base material of the bending portion is Dp, the thickness dimension of the conductor layer is Dc, and the area ratio of said conductor layer to said cable base material is A.

2. The floating type magnetic head according to claim 1, wherein the width dimension of the bending portion of said flexible cable changes gradually.

3. The floating type magnetic head according to claim 1, wherein the bending portion of said flexible cable is separated into a plurality of elements.

4. The floating type magnetic head according to claim 1, wherein the flexible cable is connected between the supporting member and the magnetic head main body without twisting.

* * * * *